(12) United States Patent
Kawashima et al.

(10) Patent No.: US 9,790,829 B2
(45) Date of Patent: Oct. 17, 2017

(54) SYSTEM FOR INJECTING FUEL INTO EXHAUST PIPE

(75) Inventors: Yukihiro Kawashima, Fujisawa (JP); Akiyoshi Kishi, Fujisawa (JP); Isao Shintani, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 286 days.

(21) Appl. No.: 13/703,438

(22) PCT Filed: Jun. 10, 2011

(86) PCT No.: PCT/JP2011/063327
§ 371 (c)(1),
(2), (4) Date: Dec. 11, 2012

(87) PCT Pub. No.: WO2011/155592
PCT Pub. Date: Dec. 15, 2011

(65) Prior Publication Data
US 2013/0086885 A1    Apr. 11, 2013

(30) Foreign Application Priority Data

Jun. 11, 2010  (JP) .................................. 2010-134520

(51) Int. Cl.
*F01N 3/00* (2006.01)
*F01N 3/025* (2006.01)
(Continued)

(52) U.S. Cl.
CPC .............. *F01N 3/0253* (2013.01); *F01N 3/36* (2013.01); *F01N 13/08* (2013.01);
(Continued)

(58) Field of Classification Search
CPC .... F01N 13/08; F01N 13/1805; F01N 3/0253; F01N 3/36; F01N 13/1827; B01D 53/9477
(Continued)

(56) References Cited

U.S. PATENT DOCUMENTS 3,983,696 A  * 10/1976  Pflugfelder ..................... 60/272
5,605,042 A     2/1997  Stutzenberger
(Continued)

FOREIGN PATENT DOCUMENTS

EP       2180156 A1   4/2010
JP       8-232759     9/1996
(Continued)

OTHER PUBLICATIONS

Patent Abstracts of Japan, Publication No. 08-232759, dated Sep. 10, 1996.
(Continued)

*Primary Examiner* — Phutthiwat Wongwian
*Assistant Examiner* — Matthew T Largi
(74) *Attorney, Agent, or Firm* — Staas & Halsey LLP

(57) ABSTRACT

A system for injecting fuel into an exhaust pipe and preventing fuel leakage. An exhaust pipe is connected to an engine via an exhaust adaptor and the fuel is injected directly into the exhaust pipe through a fuel injection valve provided in the exhaust adaptor. A lower end of the exhaust adaptor is provided with a lower flange part to which a front end flange part of the exhaust pipe is connected, and a tubular shielding part for preventing the fuel from falling onto flange surfaces and of the front end flange part and the lower flange part protrudes into the exhaust pipe.

10 Claims, 3 Drawing Sheets

(51) Int. Cl.
    *F01N 3/36* (2006.01)
    *F01N 13/08* (2010.01)
    *F01N 13/18* (2010.01)
    *B01D 53/94* (2006.01)

(52) U.S. Cl.
    CPC ...... *F01N 13/1805* (2013.01); *B01D 53/9477* (2013.01); *F01N 13/1827* (2013.01); *F01N 2610/1453* (2013.01)

(58) Field of Classification Search
    USPC .......................................... 60/285, 286, 295
    See application file for complete search history.

(56) References Cited

U.S. PATENT DOCUMENTS

| | | | |
|---|---|---|---|
| 6,192,677 | B1 | 2/2001 | Tost |
| 6,513,323 | B1 | 2/2003 | Weigl et al. |
| 6,539,708 | B1 | 4/2003 | Hofmann et al. |
| 6,883,308 | B2* | 4/2005 | Megas et al. .................. 60/280 |
| 7,730,721 | B2* | 6/2010 | Kimura et al. ................. 60/286 |
| 8,240,137 | B2* | 8/2012 | Liu et al. ....................... 60/295 |
| 8,438,839 | B2* | 5/2013 | Floyd et al. .................... 60/286 |
| 8,549,842 | B2 | 10/2013 | Park |
| 2008/0155973 | A1* | 7/2008 | Maruyama et al. ............ 60/299 |
| 2009/0031707 | A1 | 2/2009 | Itoh |
| 2009/0158717 | A1* | 6/2009 | Kimura ................. F01N 3/2066 60/295 |
| 2010/0005798 | A1* | 1/2010 | Finkbeiner et al. ............ 60/597 |
| 2011/0079003 | A1* | 4/2011 | Sun et al. ....................... 60/310 |

FOREIGN PATENT DOCUMENTS

| | | | |
|---|---|---|---|
| JP | 08232759 A * | 9/1996 | ............. F02F 11/00 |
| JP | 2005-264756 | 9/2005 | |
| JP | 2006-329019 | 12/2006 | |
| JP | 2006329019 A * | 12/2006 | |
| JP | 2007-16713 | 1/2007 | |
| JP | 2007-71161 | 3/2007 | |
| JP | 2009-156068 | 7/2009 | |
| JP | 2009-167965 | 7/2009 | |
| JP | 4407843 | 7/2009 | |
| JP | 2010-31768 | 2/2010 | |

OTHER PUBLICATIONS

Patent Abstracts of Japan, publication No. 2006-329019, dated Dec. 7, 2006.
Patent Abstracts of Japan, Publication No. 2007-016713, dated Jan. 25, 2007.
Patent Abstracts of Japan, Publication No. 2009-156068, dated Jul. 16, 2009.
International Search Report of PCT/JP2011/063327 dated Sep. 13, 2011.
Written Opinion of the International Searching Authority dated Sep. 13, 2011 in corresponding International Application No. PCT/JP2011/063327.
Patent Abstracts of Japan, Publication No. 2005-264756, dated Sep. 29, 2005.
Patent Abstracts of Japan, Publication No. 2007-71161, dated Mar. 25, 2007.
Patent Abstracts of Japan, Publication No. 2009-156072, dated Jul. 16, 2009 (Corresponds to AH).
Patent Abstracts of Japan, Publication No. 2009-167965, dated Jul. 30, 2009.
Patent Abstracts of Japan, Publication No. 2010-31768, dated Feb. 12, 2010.
International Search Report dated Sep. 13, 2011 in International Application No. PCT/JP2011/063326.
Written Opinion of the International Searching Authority dated Sep. 13, 2011 in International Application No. PCT/JP2011/063326.
Extended European Search Report dated Feb. 17, 2014 in European Patent Application No. 11792548.7.
U.S. Office Action dated Mar. 24, 2014 in U.S. Appl. No. 13/703,436.
U.S. Office Action dated Oct. 7, 2014 in U.S. Appl. No. 13/703,436.
U.S. Advisory Action dated Dec. 18, 2014 U.S. Appl. No. 13/703,436.
U.S. Office Action dated Jan. 15, 2015 in U.S. Appl. No. 13/703,436.
U.S. Appl. No. 13/703,436, filed Dec. 11, 2012, Kawashima et al, Isuzu Motors Limited.
Office Action dated Apr. 23, 2015 in U.S. Appl. No. 13/703,436.
Notice of Allowance dated Oct. 22, 2015 in U.S. Appl. No. 13/703,426.
Extended European Search Report dated Feb. 2, 2017 in corresponding European Patent Application No. 11792549.5.

* cited by examiner

SYSTEM FOR INJECTING FUEL INTO EXHAUST PIPE

CROSS REFERENCE TO RELATED APPLICATIONS

This application claims the foreign priority benefit of Japanese Application No. 2010-134520 filed Jun. 11, 2010, the contents of which are incorporated herein by reference, which serves as priority for PCT Application No. JP2011/063327 filed Jun. 10, 2011.

TECHNICAL FIELD

The present invention relates to a system for injecting fuel into an exhaust pipe, which injects fuel directly into the exhaust pipe through a fuel injection valve provided in an exhaust adaptor, in order to regenerate a DPF (Diesel Particulate Filter) for collecting PM (Particulate Matter) contained in exhaust gas.

BACKGROUND ART

As an exhaust gas purifying system for reducing the amount of PM discharged from an engine to the outside by collecting the PM using a DPF, there is known a continuous regeneration-type DPF device constituted by a DPF and a DOC (Diesel Oxidation Catalyst) provided on the upstream side of the DPF (see Patent Document 1, for example).

In this continuous regeneration-type DPF device, when the temperature of the exhaust gas is approximately 350° C. or higher, the PM collected by the DPF is continuously burned and decreased, allowing the DPF to self-regenerate. When, on the other hand, the temperature of the exhaust gas is low, the temperature of the DOC drops, and, for this reason, the DOC cannot be activated. It is, therefore, difficult to oxidize the PM to allow the DPF to self-regenerate. As a result, the PM deposits on the DPF, clogging the DPF and increasing the pressure of the exhaust gas.

The deposition amount of PM is proportional to an output value of a differential pressure sensor for measuring the difference in exhaust gas pressure between the front side and rear side of the DPF. Thus, when the output value of the differential pressure sensor exceeds a predetermined differential pressure, an ECU (Engine Control Unit) detects clogging of the filter, thereby starting DPF regeneration.

The exhaust gas purifying system forcibly increases the temperature of the exhaust gas flowing into the DPF, by performing multiple injection (multistage delay injection) or post injection (subsequent injection) within a cylinder (tube). In this manner, the DPF regeneration is performed to burn and eliminate the PM collected by the DPF. The multiple injection is performed for the purpose of increasing the temperature of the exhaust gas discharged from the engine and increasing the temperature of the DOC up to a catalyst activation temperature. The post injection is performed for the purpose of increasing the temperature of the exhaust gas at an inlet of the DPF up to a temperature equal to or greater than a temperature at which the PM is burned, by supplying a large amount of unburned fuel into the exhaust gas and oxidizing (burning) the supplied unburned fuel by means of the DOC.

Once the DPF regeneration is started, the ECU controls fuel injection, as well as an exhaust throttle and exhaust brake valve, to increase the temperature of the exhaust gas. As a result, the PM that has deposited on the DPF is burned. In this DPF regeneration, a small amount of fuel is mixed into engine oil as a result of the post injection, generating a phenomenon called dilution. Development in dilution of the engine oil might cause engine trouble.

There is proposed another system for injecting fuel into an exhaust pipe, which injects fuel directly into the exhaust pipe through a fuel injection valve provided in the exhaust pipe, for the purpose of preventing the occurrence of dilution caused by the post injection and improving regeneration control efficiency. This system for injecting fuel into an exhaust pipe is favorable in terms of assembling an engine because an exhaust adaptor of a turbocharger of the engine is provided with a fuel injection nozzle.

PRIOR ART DOCUMENTS

Patent Document 1: Japanese Patent Application Publication No. 2007-16713

In the above-described system for injecting fuel into an exhaust pipe, due to a structural reason that a front end of the exhaust pipe is connected to a lower end of the exhaust adaptor, there is concern that the fuel injected from the fuel injection valve falls on the connection between the exhaust adaptor and the exhaust pipe, causing fuel leakage at the connection.

SUMMARY OF THE INVENTION

The present invention was contrived in order to solve the problems described above. An object of the present invention, therefore, is to provide a system for injecting fuel into an exhaust pipe, which is capable of preventing fuel from leaking from the connection between an exhaust adaptor and the exhaust pipe.

In order to achieve this object, the present invention provides a system for injecting fuel into an exhaust pipe, in which the exhaust pipe is connected to an engine via an exhaust adaptor and fuel is injected directly into the exhaust pipe through a fuel injection valve provided in the exhaust adaptor, wherein a lower end of the exhaust adaptor is provided with a lower flange part to which a front end flange part of the exhaust pipe is connected, and a tubular shielding part for preventing the fuel from falling onto flange surfaces of the front end flange part and the lower flange part is provided in such a manner as to protrude into the exhaust pipe.

A predetermined space for preventing the fuel from oozing is preferably provided between the exhaust pipe and the shielding part in a radial direction of the exhaust pipe.

It is preferred that a molybdenum-coated gasket be interposed between the lower flange part of the exhaust adaptor and the front end flange part of the exhaust pipe.

It is preferred that the shielding part be integrated with the lower end of the exhaust adaptor, by allowing an inner wall of an exhaust path of the exhaust adaptor to extend into the exhaust pipe.

The space is preferably provided between the exhaust pipe and the shielding part, and set to have a size enough to prevent the fuel from oozing by a capillary action.

The present invention is capable of preventing the fuel from leaking from the connection between the exhaust adaptor and the exhaust pipe.

BRIEF DESCRIPTION OF THE DRAWINGS

FIG. 3 is a diagram showing an example of an exhaust adaptor, wherein FIG. 3(a) is a side view and FIG. 3(b) is a front view.

DETAILED DESCRIPTION

Embodiments for carrying out the present invention are described hereinafter in detail with reference to the drawings.

Figure 1:
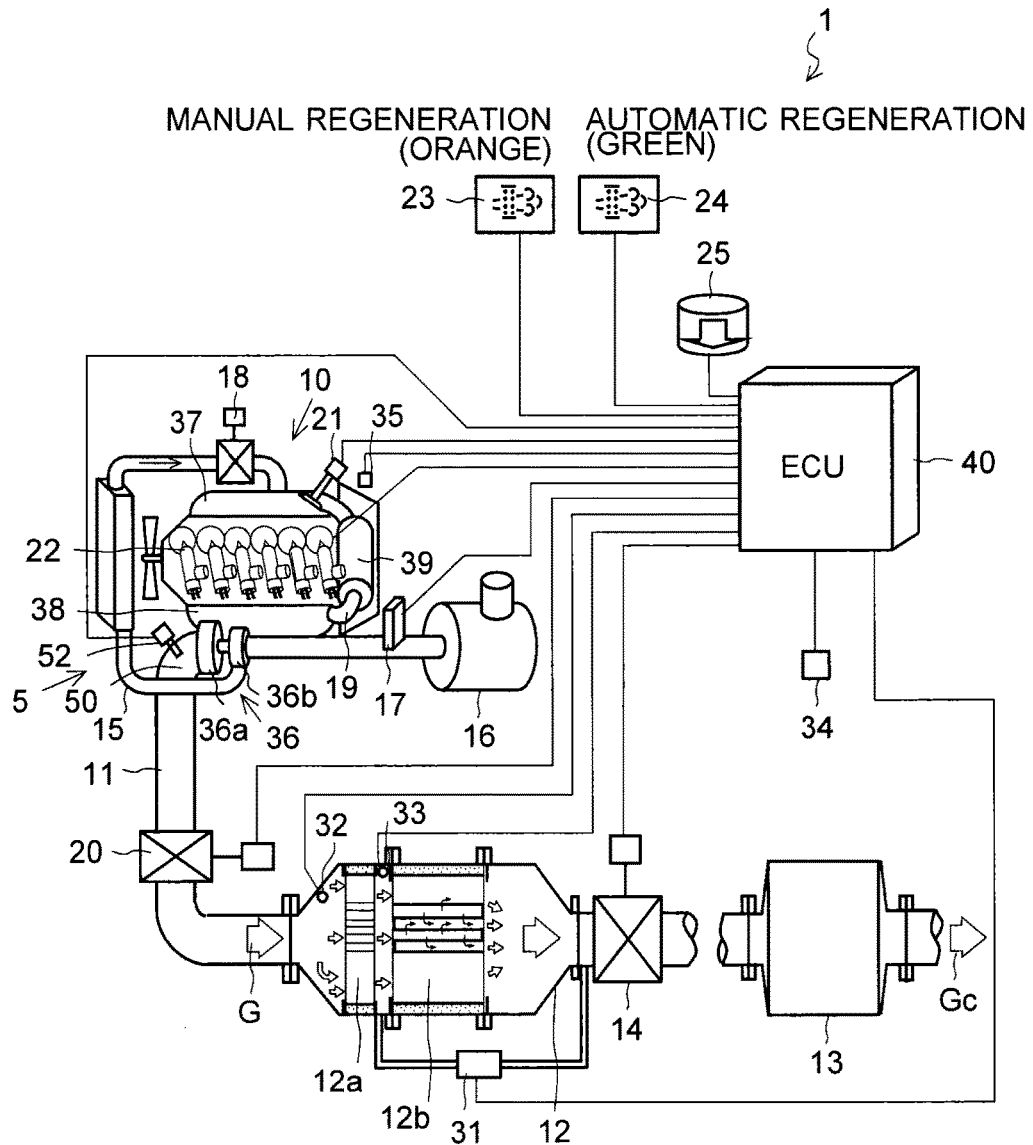
FIG. 1 is a diagram showing an exhaust gas purifying system that has a system for injecting fuel into an exhaust pipe according to an embodiment of the invention of the present application.

First, an exhaust gas purifying system 1 having a system 5 for injecting fuel into an exhaust pipe according to the present embodiment is described with reference to FIG. 1. The exhaust gas purifying system 1 has a continuous regeneration-type DPF (or DPD: Diesel Particulate Defuser) device 12 in an exhaust pipe 11 of a diesel engine (simply referred hereinafter as "engine") 10, the continuous regeneration-type DPF device 12 being a type of an exhaust gas purifying device. The continuous regeneration-type DPF device 12 has a DPF 12b for collecting PM contained in exhaust gas and a DOC 12a provided on the upstream side of the DPF 12b. The DPF 12b is constituted by a CSF (Catalyzed Soot Filter). A silencer 13 is disposed in the exhaust pipe 11 located downstream of the continuous regeneration-type DPF device 12. Exhaust gas G is purified by the continuous regeneration-type DPF device 12 and emitted to the atmosphere via the silencer 13 as purified exhaust gas Gc.

The DOC 12a is formed by allowing a carrier having a honeycomb structure of porous ceramic to carry an oxidation catalyst such as platinum. The DPF 12b is formed from a monolithic honeycomb wall-flow type filter in which an inlet and outlet of a porous ceramic honeycomb channel are sealed alternately. This filter carries a catalyst such as platinum or cerium oxide. The PM (particulate matter) contained in the exhaust gas G is collected (trapped) by a porous ceramic wall.

A conduction pipe that connects the front and rear sides of the DPF 12b is provided with a differential pressure sensor 31 for detecting the difference in pressure between the front side and rear side of the DPF 12b in order to estimate the deposition amount of PM on the DPF 12b. The exhaust pipe 11 located on the downstream side of the continuous regeneration-type DPF device 12 is provided with an exhaust throttle valve 14 as means for throttling the exhaust gas. The exhaust pipe 11 located on the upstream side of the continuous regeneration-type DPF device 12 is provided with an exhaust brake 20.

A DOC inlet exhaust temperature sensor 32 for detecting the temperature of the exhaust gas flowing into the DOC 12a is provided on the upstream side of the DOC 12a of the continuous regeneration-type DPF device 12. A DPF inlet exhaust temperature sensor 33 for detecting the temperature of the exhaust gas flowing into the DPF 12b is provided between the DOC 12a and the DPF 12b.

An intake pipe 15 of the engine 10 is provided with, over the length from an intake port to the engine 10, an air cleaner 16, mass air flow (MAF) sensor (incoming air volume sensor) 17, compressor 36b of a turbocharger 36, and intake throttle valve (intake throttle) 18. The intake throttle valve 18 adjusts the intake volume of exhaust gas supplied to an intake manifold 37. The exhaust gas discharged from an exhaust manifold 38 flows into the continuous regeneration-type DPF device 12 through a turbine 36a of the turbocharger 36 and the exhaust brake 20. The turbocharger 36 is mounted in the engine 10. A front end of the exhaust pipe 11 is connected to a lower end of an after-mentioned exhaust adaptor 50 that forms an outlet-side exhaust path 51 (FIG. 4) at the turbine 36a. The exhaust adaptor 50 is provided with a fuel injection valve 52 for injecting fuel directly into the exhaust pipe 11.

An exhaust gas recirculation (EGR) pipe 19, which returns some of the exhaust gas discharged from the engine 10 to the intake manifold 37, is connected to the intake manifold 37 and the exhaust manifold 38. The EGR pipe 19 is provided with an EGR cooler 39 for cooling the exhaust gas returning to the intake manifold 37, and an EGR valve 21 for adjusting an EGR amount, which is the amount of exhaust gas returning to the intake manifold 37.

Signals from the MAF sensor 17, the DOC inlet exhaust temperature sensor 32, the DPF inlet exhaust temperature sensor 33, a vehicle speed sensor 34, and an engine speed sensor 35 are input to an ECU (electronic control unit) 40 that functions as a control device for controlling the entire engine 10 and performing DPF regeneration control. A control signal sent from the ECU 40 controls the exhaust throttle valve 14, the exhaust brake 20, the intake throttle valve 18, the EGR valve 21, a fuel injection device 22, the fuel injection valve 52, and the like.

The exhaust gas purifying system 1 has a total post amount computation part, an accumulated diluted amount calculation part, a regeneration interval measuring part, and a forcible regeneration part, which are all mounted in the ECU 40.

The total post amount computation part computes a total post amount required in a single DPF regeneration. The accumulated diluted amount calculation part integrates a diluted amount for each DPF regeneration and subtracts a diluted amount from the obtained result to calculate the accumulated diluted amount, the diluted amount decreasing as a vehicle travels. The regeneration interval measuring part measures a regeneration interval between the end of a DPF regeneration and the beginning of the subsequent DPF regeneration. The forcible regeneration part performs automatic regeneration where DPF regeneration takes place automatically during traveling of the vehicle, when a condition that the accumulated diluted amount is less than a predetermined threshold value and a condition that the regeneration interval is equal to or greater than a predetermined threshold value (referred to as "automatic regeneration conditions," hereinafter) are satisfied when the PM deposition amount in the DPF 12b exceeds a predetermined amount. The forcible regeneration part turns on an automatic regeneration lamp (green) 24 during the automatic regeneration.

While the vehicle is stopped, the forcible regeneration part encourages a driver to perform manual regeneration where the DPF regeneration is performed manually, when the automatic regeneration conditions are not satisfied when the PM deposition amount in the DPF 12b exceeds the predetermined amount. The forcible regeneration part consequently performs the manual regeneration in response to an operation that is input by the driver during the stopped state of the vehicle. When the PM deposition amount in the DPF 12b exceeds the predetermined amount and the automatic regeneration conditions are not satisfied, the forcible regeneration part flashes (blinks) a manual regeneration lamp (orange) 23 to encourage (alert) the driver to perform the manual regeneration. Furthermore, during the manual regeneration, the forcible regeneration part turns on the manual regeneration lamp (orange) 23 to display information indicating that the manual regeneration is performed. In addition, the forcible regeneration part executes the manual regeneration when the driver presses a manual regeneration button (DPF manual regeneration execution switch) 25 during the stopped state of the vehicle.

The PM deposition amount is detected based on the difference in pressure between the front side and rear side of the DPF 12b, which is detected by the differential pressure sensor 31, and a travel distance of the vehicle that is calculated based on the vehicle speed detected by the vehicle speed sensor 34. In other words, when the difference in pressure between the front side and rear side of the DPF 12b exceeds a predetermined threshold value or when the travel distance exceeds a predetermined threshold value, the forcible regeneration part determines that the PM deposition amount in the DPF 12b exceeds the predetermined amount.

In the DPF regeneration, when the exhaust gas temperature that is detected by the DOC inlet exhaust temperature sensor 32 or the DPF inlet exhaust temperature sensor 33 is lower than a first determination value (a DOC activation temperature of, for example, 250° C.), multiple injection is performed along with post injection or in-pipe injection, to increase the temperature of the exhaust gas discharged from the engine 10. When the exhaust gas temperature that is detected by the DOC inlet exhaust temperature sensor 32 or the DPF inlet exhaust temperature sensor 33 is equal to or greater than the first determination value, PM burning removal control is executed to perform post injection or in-pipe injection, forcibly regenerating the DPF 12b. In the PM burning removal control, multiple injection is combined with post injection or in-pipe injection, if needed. In the manual regeneration, the exhaust brake 20 is closed until the exhaust gas temperature becomes equal to or greater than the first determination value, whereby the exhaust gas temperature is increased rapidly. In the manual regeneration, the exhaust throttle valve 14 is closed to throttle the exhaust gas at the time of the PM burning removal control, whereby the exhaust gas temperature is increased.

Figure 2:
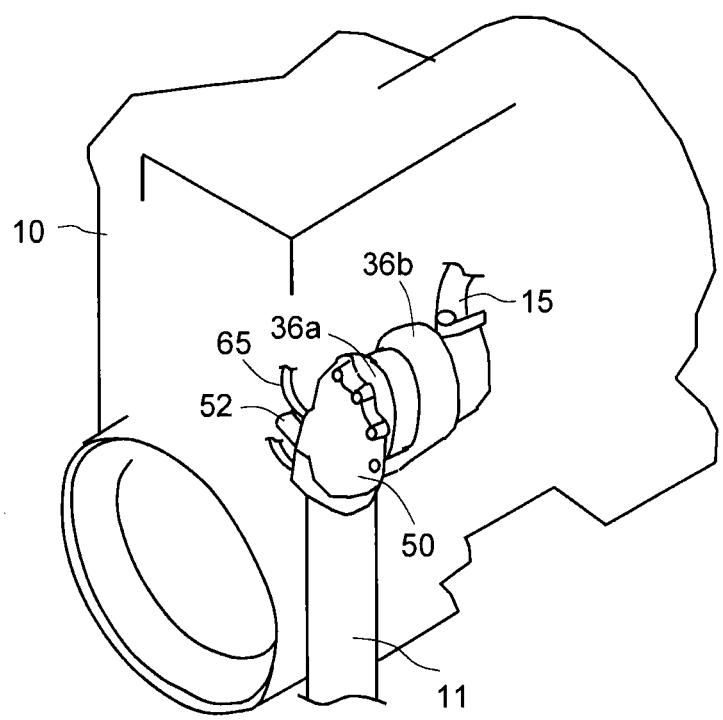
FIG. 2 is a perspective view schematically showing a configuration around an engine of the system for injecting fuel into an exhaust pipe.
Figure 3:
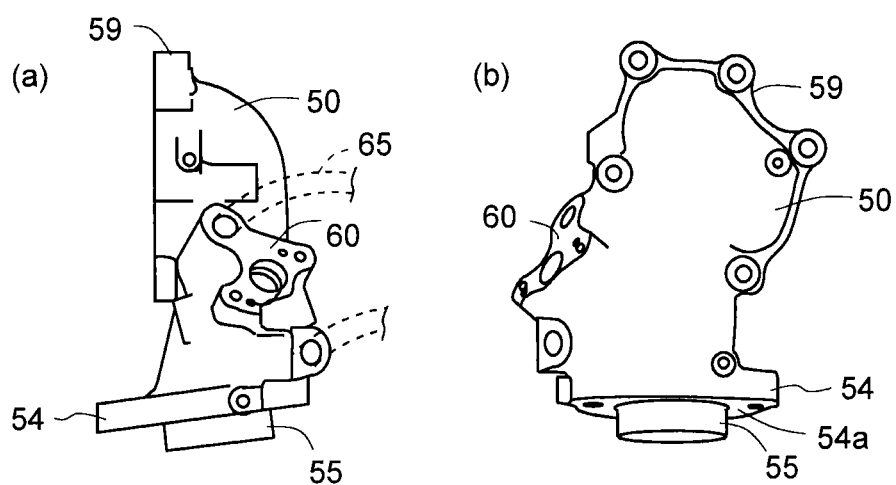
Figure 4:
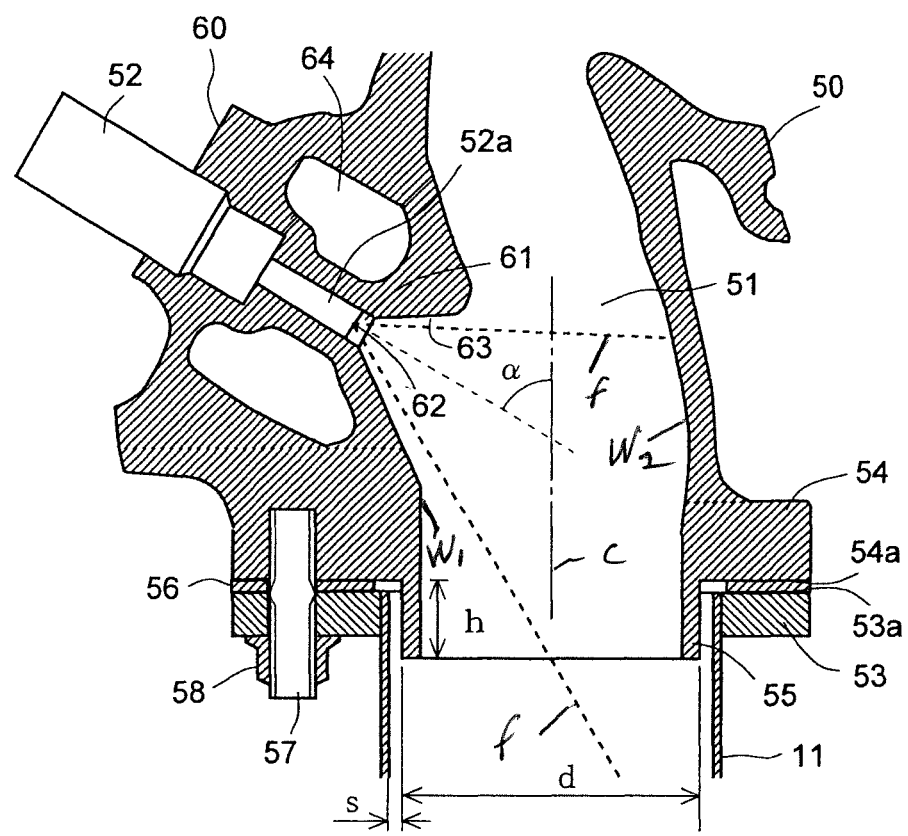
FIG. 4 is a cross-sectional diagram showing a structure of a connection between the exhaust adaptor and the exhaust pipe.

In the system 5 for injecting fuel into an exhaust pipe, which has the fuel injection valve 52 provided in the exhaust adaptor 50 of the turbocharger 36 and injects fuel directly into the exhaust pipe 11 in order to perform the DPF regeneration, the front end of the exhaust pipe 11 is connected to the lower or downstream (relative to exhaust gas stream) end of the exhaust adaptor 50. Therefore, the fuel injected from the fuel injection valve 52 falls on this connection, causing fuel leakage where the fuel oozes out from the connection. In order to solve this problem, the lower end of the exhaust adaptor 50 is provided with a lower flange part 54 to which a front end flange part 53 of the exhaust pipe 11 is connected, as shown in FIGS. 2 to 4. In addition, a tubular shielding part 55 for preventing the fuel from falling onto flange surfaces 53a and 54a of the front end flange part 53 and the lower flange part 54 is provided in the lower end of the exhaust adaptor 50 in such a manner as to protrude into the exhaust pipe 11. This shielding part 55 is integrated with the lower end of the exhaust adaptor 50, by allowing the inner wall of the exhaust path 51 of the exhaust adaptor 50 to protrude or extend downward (i.e., to the inside of the exhaust pipe 11).

An outer diameter d of the shielding part 55 is, for example, 70 mm. A protruding length h of the shielding part 55 is, for example, 16.5 mm. A predetermined space (clearance) s for preventing the fuel from oozing by a capillary action is provided between the shielding part 55 and the exhaust pipe 11 in a radial direction of the exhaust pipe 11. In other words, the space s is preferably set to have a size enough to prevent the fuel from oozing, by a capillary action. The width of this space s is, for example, 2.7 mm. A smooth, molybdenum-coated gasket 56 with heat-resistant property is interposed between the lower flange part 54 of the exhaust adaptor 50 and the front end flange part 53 of the exhaust pipe 11.

A plurality of stud bolts 57 are implanted in the lower flange part 54 of the exhaust adaptor 50. Screwing nuts 58 to the stud bolts 57 connects the front end flange part 53 of the exhaust pipe 11 to the lower flange 54.

As shown in FIG. 4, the exhaust adaptor 50 includes a first side wall "W1" and a second side wall having a concave-shaped portion "W2". The first side wall "W1" receives therein the fuel injection valve 52 so as to directly face the concave-shaped portion "W2". The valve 52 extends at an angle α from a shaft center (shaft center line) c of the exhaust pipe 11 in order to inject the fuel "f" against the concave-shaped portion "W2" and obliquely downward to the exhaust path 51 such that the fuel can easily be mixed into the exhaust gas. An upper flange part 59 that is connected to the turbine 36a of the turbocharger 36 is provided in an upper part of the exhaust adaptor 50. A vertically intermediate part of the exhaust adaptor 50 is provided with a fuel injection valve attachment part 60 to which the fuel injection valve 52 is attached. This fuel injection valve attachment part 60 is provided with an insertion hole 61 into which the front end of the fuel injection valve 52 is inserted.

In order to prevent a fuel content of the exhaust gas from adhering and depositing onto a spray hole 62 at the front end 52a of the fuel injection valve 52 inserted into the insertion hole 61 when the spray hole 62 is exposed to the high-temperature exhaust gas, the front end 52a of the fuel injection valve 52 is disposed radially outwardly away from an inner wall part of the exhaust path 51 of the exhaust adaptor 50 so as not to come into contact with a flow of the exhaust gas inside the exhaust adaptor 50. More specifically, the inner wall part of the exhaust path 51 of the exhaust adaptor 50 is provided with a cone-shaped concave part 63 that gradually tapers from the exhaust path 51 toward the front end of the insertion hole 61. The front end 52a of the fuel injection valve 52 is also provided away from (in such a manner as to be retracted from) a boundary where the front end of the insertion hole 61 and the concave part 63 intersect with each other.

A coolant passage 64 for cooling the periphery of the front end 52a of the fuel injection valve 52 is provided in the fuel injection valve attachment part 60. A coolant of the engine 10 circulates in the coolant passage 64 through a coolant pipe line 65, which is not shown.

According to the system 5 for injecting fuel into an exhaust path, which is configured as described above, the exhaust pipe 11 is connected to the engine 10 via the exhaust adaptor 50 and fuel is injected directly into the exhaust pipe 11 through the fuel injection valve 52 provided in the exhaust adaptor 50. The lower end of the exhaust adaptor 50 is provided with the lower flange part 54 to which the front end flange part 53 of the exhaust pipe 11 is connected, and the tubular shielding part 55 for preventing the fuel from falling onto the flange surfaces 53a and 54a of the front end flange part 53 and the lower flange part 54 is provided in such a manner as to protrude into the exhaust pipe 11. This configuration can prevent the fuel from falling onto the flange surfaces 53a and 54a and leaking from the connection between the exhaust adaptor 50 and the exhaust pipe 11.

Moreover, the predetermined space s, which is provided between the exhaust pipe 11 and the shielding part 55 in the radial direction of the exhaust pipe 11 to prevent the fuel from oozing, can also prevent the fuel leakage.

In addition, because the molybdenum-coated gasket 56 is interposed between the lower flange part 54 of the exhaust adaptor 50 and the front end flange part 53 of the exhaust pipe 11, the heat-resistant property and smoothness of the molybdenum coating can ensure sealing properties while tolerating vibration-induced slippage between the flange surfaces 53a and 54a of the front end flange part 53 and the lower flange part 54 that face each other.

Unlike the post injection, dilution does not occur in the direct in-pipe injection. Thus, by not adding up the diluted amounts in the exhaust gas purifying system 1, the manual generation is less requested, improving user convenience.

The invention claimed is:

1. A system for injecting fuel into an exhaust pipe of an engine, comprising:
    an exhaust pipe located at a lower, downstream end of an exhaust adaptor,
    an exhaust path defined by a wall formed in the exhaust adaptor;
    a fuel injection valve provided in a first side of the wall intermediately in a vertical direction of the exhaust adaptor to inject a fuel stream obliquely downward into the exhaust path,
    wherein a second side of the wall is opposite the first side of the wall and includes a portion that has a concave-shaped relative to the fuel injection valve, which portion directly faces the fuel injection valve, and at least part of the fuel from the fuel injection valve is injected directly onto the concave-shaped portion,
    wherein the lower end of the exhaust adaptor has a lower flange part to which a front end flange part of the exhaust pipe is connected; and
    a tubular shielding part protruding from the lower end of the exhaust adaptor and into the exhaust pipe for preventing the fuel injected into the exhaust path from falling onto surfaces of the front end flange part and the lower flange part,
    wherein an inner wall part of the shielding part is located closer to a center line of the exhaust pipe than a deepest part of the concave-shaped portion.

2. The system for injecting fuel into an exhaust pipe according to claim 1, wherein a predetermined space for preventing the fuel from leaking is provided between the exhaust pipe and the shielding part in a radial direction of the exhaust pipe.

3. The system for injecting fuel into an exhaust pipe according to claim 2, wherein a molybdenum-coated gasket is interposed between the flanges.

4. The system for injecting fuel into an exhaust pipe according to claim 3, wherein the exhaust adaptor is connected between a turbine of a turbocharger of the engine and an upper end of the exhaust pipe, the exhaust adaptor is bent downward from the turbine, and a coolant passage is formed in the exhaust adaptor for cooling the fuel injection valve.

5. The system for injecting fuel into an exhaust pipe according to claim 2, wherein the exhaust adaptor is connected between a turbine of a turbocharger of the engine and an upper end of the exhaust pipe, the exhaust adaptor is bent downward from the turbine, and a coolant passage is formed in the exhaust adaptor for cooling the fuel injection valve.

6. The system for injecting fuel into an exhaust pipe according to claim 2, wherein the space is sized to prevent the fuel from leaking by a capillary action between the exhaust pipe and the shielding part.

7. The system for injecting fuel into an exhaust pipe according to claim 1, wherein a molybdenum-coated gasket is interposed between the flanges.

8. The system for injecting fuel into an exhaust pipe according to claim 7, wherein the exhaust adaptor is connected between a turbine of a turbocharger of the engine and an upper end of the exhaust pipe, the exhaust adaptor is bent downward from the turbine, and a coolant passage is formed in the exhaust adaptor for cooling the fuel injection valve.

9. The system for injecting fuel into an exhaust pipe according to claim 1, wherein the exhaust adaptor is connected between a turbine of a turbocharger of the engine and an upper end of the exhaust pipe, the exhaust adaptor is bent downward from the turbine, and a coolant passage is formed in the exhaust adaptor for cooling the fuel injection valve.

10. The system for injecting fuel into an exhaust pipe according to claim 1, wherein the shielding part is formed as one piece with the exhaust adaptor.

* * * * *